US009225017B2

(12) United States Patent
Sakitou et al.

(10) Patent No.: US 9,225,017 B2
(45) Date of Patent: Dec. 29, 2015

(54) ALKALINE STORAGE CELL AND METHOD FOR MANUFACTURING ALKALINE STORAGE CELL (75) Inventors: Yuuki Sakitou, Toyohashi (JP); Hiroyuki Sakamoto, Toyohashi (JP)

(73) Assignee: PRIMEARTH EV ENERGY CO., LTD., Kosai-Shi (JP)

( * ) Notice: Subject to any disclaimer, the term of this patent is extended or adjusted under 35 U.S.C. 154(b) by 235 days.

(21) Appl. No.: 14/005,201

(22) PCT Filed: May 30, 2012

(86) PCT No.: PCT/JP2012/063958
§ 371 (c)(1),
(2), (4) Date: Sep. 13, 2013

(87) PCT Pub. No.: WO2012/169409
PCT Pub. Date: Dec. 13, 2012

(65) Prior Publication Data
US 2014/0004424 A1  Jan. 2, 2014

(30) Foreign Application Priority Data
Jun. 10, 2011  (JP) .................... 2011-130363

(51) Int. Cl.
*H01M 4/24* (2006.01)
*H01M 4/38* (2006.01)
*H01M 4/32* (2006.01)
*H01M 10/44* (2006.01)
(Continued)

(52) U.S. Cl.
CPC ............ *H01M 4/383* (2013.01); *H01M 4/0402* (2013.01); *H01M 4/32* (2013.01); *H01M 4/52* (2013.01); *H01M 10/44* (2013.01); *H01M 10/30* (2013.01); *H01M 10/345* (2013.01); *Y02E 60/124* (2013.01); *Y10T 29/49115* (2015.01)

(58) Field of Classification Search
CPC .......... H01M 4/32; H01M 4/242; H01M 4/52
See application file for complete search history.

(56) References Cited

U.S. PATENT DOCUMENTS 5,277,999 A * 1/1994 Ovshinsky et al. ............. 429/59
5,344,728 A * 9/1994 Ovshinsky et al. ........... 429/223

(Continued)

FOREIGN PATENT DOCUMENTS

| EP | 1100141 A1 | 5/2001 |
| JP | 10-040950 A | 2/1998 |

(Continued)

OTHER PUBLICATIONS

European Search Report dated Nov. 11, 2014 as received in Application No. EP 12796416.1.

*Primary Examiner* — Stewart Fraser
*Assistant Examiner* — Olatunji Godo
(74) *Attorney, Agent, or Firm* — Maschoff Brennan (57) ABSTRACT

An alkaline storage cell comprises a positive electrode including a cobalt additive and nickel hydroxide particles that have been covered by a cobalt compound film layer, and a negative electrode including a hydrogen-absorbing alloy that contains nickel and cobalt. The positive electrode has a capacitance V, the negative electrode has a capacitance W, the cobalt additive is cobalt metal or a cobalt compound, the positive electrode contains X mass % of the cobalt additive, the cobalt is included by Y mass % in the hydrogen-absorbing alloy, and X, Y, V, and W satisfy the relationship $1.1 \leq (X/Y) \times (W/V) \leq 1.91$.

5 Claims, 2 Drawing Sheets (51) Int. Cl.
  *H01M 4/04* (2006.01)
  *H01M 4/52* (2010.01)
  *H01M 10/30* (2006.01)
  *H01M 10/34* (2006.01)

(56) References Cited

U.S. PATENT DOCUMENTS 6,136,473 A 10/2000 Furukawa et al.
6,593,031 B1 7/2003 Onishi et al.
2005/0238959 A1* 10/2005 Young et al. ............... 429/218.2
2005/0238960 A1 10/2005 Nakamura et al.
2006/0097701 A1 5/2006 Kodama et al.
2009/0202909 A1 8/2009 Sakamoto et al.

FOREIGN PATENT DOCUMENTS

| | | |
|---|---|---|
| JP | 2005-105356 A | 4/2005 |
| JP | 2005-310580 A | 11/2005 |
| JP | 2006-048954 A | 2/2006 |
| WO | 2004/068625 A1 | 8/2004 |

* cited by examiner

ALKALINE STORAGE CELL AND METHOD FOR MANUFACTURING ALKALINE STORAGE CELL

TECHNICAL FIELD

The present invention relates to an alkaline storage battery including a cathode that contains nickel hydroxide and an anode containing a hydrogen-absorbing alloy and a method of manufacturing the alkaline storage battery.

BACKGROUND ART

As is well known, various alkaline storage batteries (rechargeable batteries) are used as a power supply for portable electronic equipment and for electric vehicles, hybrid electric vehicles and the like. One type of the alkaline storage batteries is a nickel-metal hydride storage battery which are high in energy density and excellent in reliability. The nickel-metal hydride storage battery includes a cathode containing nickel hydroxide as a principal component, an anode containing a hydrogen-absorbing alloy as a principal component, and an alkaline electrolyte containing potassium hydroxide or the like.

Figure 3:
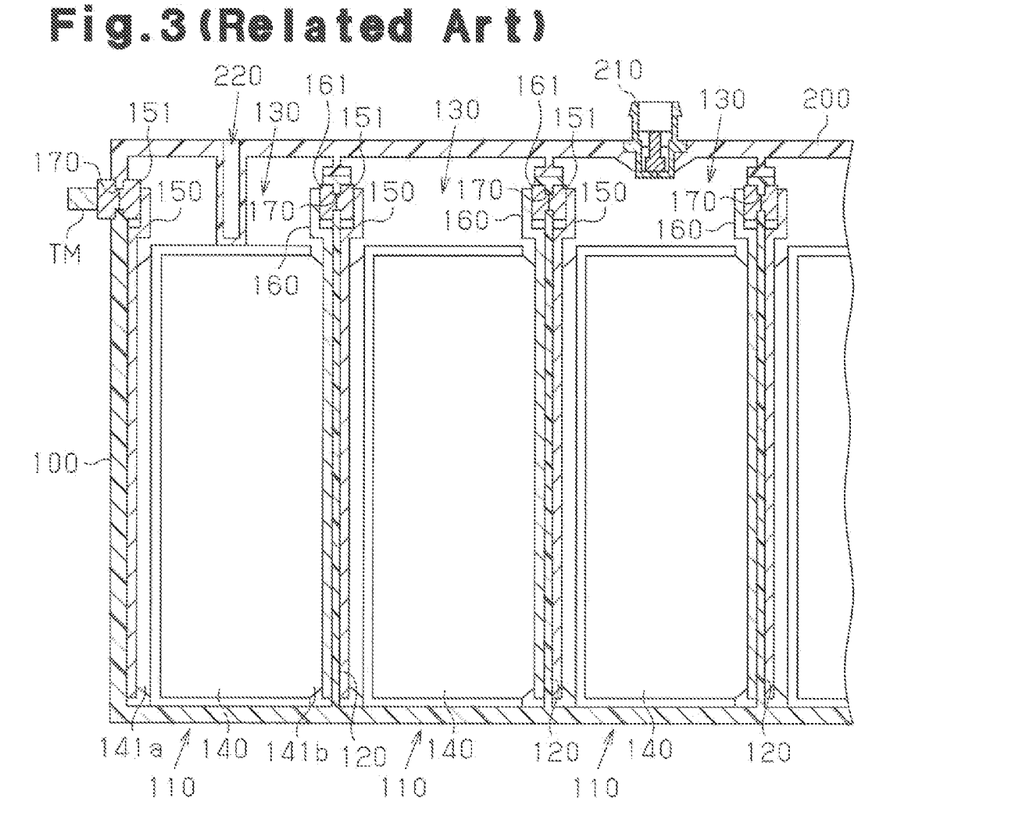
FIG. 3 is a partial sectional view of a conventional, rectangular, sealed alkaline storage battery.

As a nickel-metal hydride storage battery for a vehicle, there is known a rectangular, sealed storage battery in which a plurality of electric cells are electrically connected in series to generate a certain power capacity. FIG. 3 illustrates a partial sectional view of such rectangular, sealed storage battery.

The rectangular, sealed storage battery illustrated in FIG. 3 includes a plurality of battery cases 130 each forming an individual battery cell 110 that is a nickel-metal hydride storage battery. The plurality of battery cases 130 are connected together via partitions 120 and housed inside a rectangular, integral battery case 100. Upper openings of the battery cases 130 are sealed by a lid 200. Inside each battery cell 130, a power generation element, made up of an electrode plate group 140, formed by laminating cathode plates and anode plates via a separator, and current collectors 150 and 160, respectively joined to opposite sides of the electrode plate group 140, is housed together with an electrolyte. A lead portion 141a, projecting to a side from each cathode plate of the electrode plate group 140, is joined to the current collector 150, and a lead portion 141b, projecting to a side from each anode plate of the electrode plate group 140, is joined to the current collector 160. The current collectors 150 and 160 respectively include connection projections 151 and 161. By the connection projections 151 and 161 of the current collectors 150 and 160 of adjacent battery cases 130 being electrically connected together via a through hole 170 in the partition 120, the adjacent battery cases 130 are electrically connected in series. The total output of the plurality of battery cases 130, that is, the plurality of battery cell 110 that are thus connected in series is taken out from a cathode or anode connection terminal TM provided in the through hole 170 of an end side wall of the integral battery case 100. Besides the above, in the present rectangular, sealed storage battery, a safety valve 210 for releasing the internal pressure in the integral battery case 100 when the pressure becomes no less than a fixed value, a sensor installation hole 220 for installing a sensor for detecting the internal temperature of the battery, etc., are provided in the lid 200.

Hydrogen is generated during charging of a nickel-metal hydride storage battery, and the generation of hydrogen gas is suppressed by hydrogen absorption by the hydrogen-absorbing alloy. To prevent the hydrogen gas that cannot be absorbed by the hydrogen-absorbing alloy from increasing the internal pressure of the storage battery, the capacity of the anode is made no less than 1.5 times the capacity of the cathode to increase the rate of hydrogen absorption by the hydrogen-absorbing alloy in many cases. However, in this case, the capacity portion of the anode capacity that is in excess of the cathode capacity is a wasted capacity that is not used by the storage battery. An example of a nickel-metal hydride storage battery by which such waste of capacity of the anode can be reduced is described in Patent Document 1.

The nickel-metal hydride storage battery described in Patent Document 1 is provided with a cathode including an active substance containing nickel hydroxide as a principal component and an anode including a hydrogen-absorbing alloy. A composition ratio of five metals making up the hydrogen-absorbing alloy of the anode is set to a certain ratio to increase hydrogen absorption rate of the hydrogen-absorbing alloy. That is, the rate of hydrogen absorption by the hydrogen-absorbing alloy of the anode is increased so that the hydrogen generated during charging is absorbed rapidly and the generation of hydrogen gas from the anode is suppressed. The capacity of the anode of the nickel-metal hydride storage battery is thereby suppressed to approximately 1.1 to 1.5 times the capacity of the cathode and increase of the internal pressure of the storage battery is also suppressed.

PRIOR ART DOCUMENTS

Patent Documents

Patent Document 1: Japanese Laid-Open Patent Publication No. 2005-105356

SUMMARY OF THE INVENTION

With the nickel-metal hydride storage battery described in Patent Document 1, the alloy usage amount of the anode is suppressed by suppression of the amount of increase of the anode capacity with respect to the cathode capacity as described above. However, the composition ratio of the plurality of metals making up the anode and the cathode can be selected from among innumerable choices, and in promoting the optimization of the battery characteristics, including the suppression of waste of the anode capacity, there is still room for improvement regarding the specifying of the component ratio of the metals.

The present invention has been made in view of such circumstances and an object thereof is to provide an alkaline storage battery with a ratio of metals contained in the electrodes by which further optimization of the battery characteristics of the alkaline storage battery can be promoted, and a method for manufacturing the alkaline storage battery.

To achieve the above object, a first aspect of the present invention provides an alkaline storage battery including: a cathode including nickel hydroxide particles coated with a cobalt compound coating layer, and a cobalt additive; and an anode including a hydrogen-absorbing alloy that contains nickel and cobalt. The cathode has a capacity V. The anode has a capacity W. The cobalt additive is metal cobalt or a cobalt compound. The cobalt additive is contained at X % by mass in the cathode. The cobalt is contained at Y % by mass in the hydrogen-absorbing alloy. X, Y, V, and W satisfy $1.1 \leq (X/Y) \times (W/V) \leq 1.91$.

A second aspect of the present invention provides a method of manufacturing an alkaline storage battery including a cathode, which includes nickel hydroxide particles coated with a cobalt compound coating layer, and a cobalt additive, and an anode, which includes a hydrogen-absorbing alloy that contains nickel and cobalt. The method includes: adding metal cobalt or a cobalt compound as the cobalt additive to the nickel hydroxide particles coated with the cobalt compound coating layer to prepare the cathode having a capacity V and containing X % by mass of the cobalt additive; preparing the anode having a capacity W from the hydrogen-absorbing alloy, with the hydrogen-absorbing alloy containing Y % by mass of the cobalt; and a preprocessing step of respectively setting X, Y, V, and W to satisfy $1.1 \leq (X/Y) \times (W/V) \leq 1.91$ before the preparing the cathode and the preparing the anode.

By the alkaline storage battery and the method for manufacturing the alkaline storage battery according to the present invention, an alkaline storage battery can be made to have a ratio of metals contained in the electrodes by which further optimization of battery characteristics can be promoted.

DESCRIPTION OF EMBODIMENTS

An alkaline storage battery according to an embodiment of the present invention will be described.

A nickel-metal hydride storage battery, as an alkaline storage battery, is a sealed type battery and is used as a power supply for electric vehicles or hybrid electric vehicles. The nickel-metal hydride storage battery may have the structure, for example, illustrated in FIG. 3. To be more detailed, the nickel-metal hydride storage battery is arranged by connecting a current collector to an electrode group, formed by laminating a certain number of anode plates, each containing a hydrogen-absorbing alloy, and a certain number of cathode plates, each containing nickel hydroxide (Ni(OH)$_2$), via separators arranged from a non-woven fabric of an alkali-resistant resin, and housing the electrodes, together with an electrolyte, inside a battery case made of resin.

Preparation of the nickel-metal hydride storage battery will be described.

[Preparation of Cathode Active Material]

A coating layer of cobalt oxyhydroxide is formed as a cobalt compound coating layer on surfaces of the nickel hydroxide particles. A cathode active material arranged from the nickel hydroxide particles coated with the cobalt compound coating layer was thereby produced.

[Manufacture of Nickel Cathode]

Thereafter, a nickel cathode that makes up the cathode plate was produced. Specifically, certain amounts of a metal cobalt (Co) powder and water were added to the cathode active material powder obtained as described above, and kneading was performed to prepare a paste.

In the present embodiment, the certain amount of the metal cobalt powder with respect to the total mass of the cathode active material particles and the metal cobalt is 2.8% by mass. That is, the metal cobalt amount (percentage by mass of metal cobalt in the cathode) X added to the cathode is 2.8% by mass.

The paste was coated onto a foamed nickel substrate (porous substrate) to fill the pores and dried, and pressure forming was performed to produce a nickel cathode plate. The nickel cathode plate was cut to a certain size and it was thereby possible to obtain the cathode plate. The theoretical capacity of the nickel electrode (cathode plate) is calculated by assuming that the nickel in the active material undergoes a single-electron reaction.

[Manufacture of Anode]

The anode containing the hydrogen-absorbing alloy was produced by a known method. As the hydrogen-absorbing alloy, an MmNi5 type alloy, with which various substitutions were performed on an alloy of Ni and Mischmetal (hereinafter referred to as "Mm"), which is a mixture of rare earth elements or, to be more specific, lanthanoid chemical elements, such as La, Ce, Pr, Nd, Sm and the like, was used. Specifically, a hydrogen-absorbing alloy in which a portion of Ni is substituted by Co (cobalt), that is for example, $MmNi_aCo_bAl_cMn_d$ (where a=4.18, b=0.2, c=0.42, d=0.45) was used. The hydrogen-absorbing alloy is a so-called AB5 alloy, with the metal element A being Mm and the metal elements B containing Ni as the main element and also containing at least cobalt (Co) as a component. By then coating a certain amount of the hydrogen-absorbing alloy powder $MmNi_aCo_bAl_cMn_d$, adjusted to be of a certain particle diameter, on an electrode support, it was possible to obtain the anode plate. Here, the atomic weight of Mm is 139.70 g/mol, the atomic weight of Ni is 58.69 g/mol, the atomic weight of Co is 58.93 g/mol, the atomic weight of Al is 26.98 g/mol, and the atomic weight of Mn is 54.94 g/mol. The mass of 1 mole of $MmNi_{4.18}Co_{0.2}Al_{0.42}Mn_{0.45}$ is thus calculated as being 432.86 g from $139.70 \times 1 + 58.69 \times 4.18 + 58.93 \times 0.2 + 26.98 \times 0.42 + 54.94 \times 0.45$. The mass of 0.2 moles of Co (cobalt) is 11.79 g and this corresponds to 2.7% by mass of the metals contained in the hydrogen-absorbing alloy. That is, the cobalt amount (percentage by mass of cobalt in the hydrogen-absorbing alloy of the anode) Y contained in the anode is thus 2.7% by mass.

[Manufacture of Alkaline Storage Battery]

The cathode plates and the anode plates of the certain numbers were laminated via the separators arranged from the non-woven fabric of the alkali-resistant resin, connected to the current collector, and housed, together with the electrolyte containing potassium hydroxide (KOH) as a principal component, inside the battery case made of resin to produce the rectangular, sealed nickel-metal hydride storage battery. The alkaline storage battery was produced, for example, with the cathode capacity V being 10000 mAh and the anode capacity W being 13000 mAh. The anode capacity W/cathode capacity V, that is the capacity ratio of the present alkaline storage battery is "13000/10000=1.30" and with this alkaline storage battery, the anode capacity W is 1.3 times the cathode capacity V.

Figure 2:
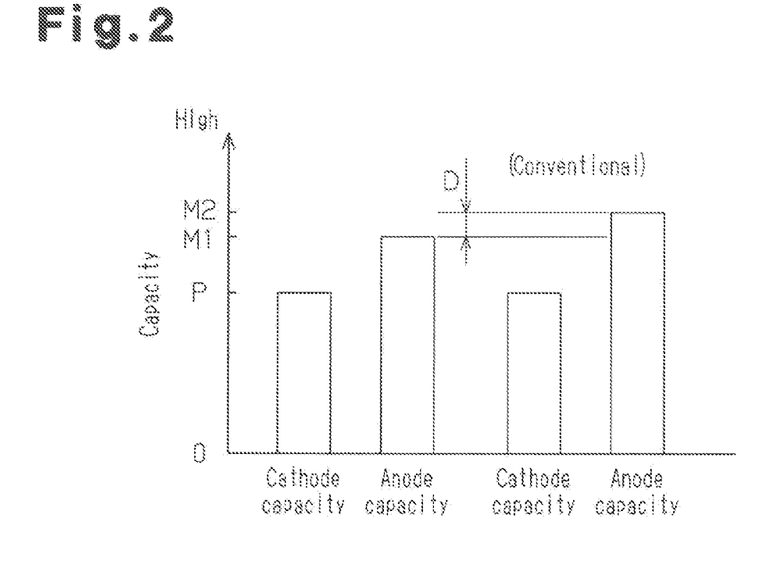
FIG. 2 is a graph illustrating cathode capacities and anode capacities in the alkaline storage battery according to the embodiment and in a conventional alkaline storage battery.

In the present embodiment, the anode capacity W/cathode capacity V was set, for example as illustrated in FIG. 2, to a value less than the conventional capacity ratio of 1.5 determined from capacity M2/capacity P. That is, in the present embodiment, the capacity M1 is made to have a smaller value than the capacity M2 to set the value of the anode capacity W/cathode capacity V, determined as capacity M1/capacity P, in other words, the capacity ratio to a value in a range from 1.20 to 1.48. This capacity ratio range is based on experiments and experience of the inventor. Therefore, for example, if the cathode capacity V is fixed, the anode capacity W can be changed from the conventional capacity M2 to the capacity M1 that is less than the capacity M2 by the capacity difference D.

[Evaluation of Alkaline Storage Battery]

The measurement of the activation rate of the nickel-metal hydride storage battery produced in the present embodiment and the measurement of the internal pressure of the storage battery (battery internal pressure) will be described in detail. In the present embodiment, the activation of the nickel-metal hydride storage battery refers to the increase of surface area of the hydrogen-absorbing alloy contained in the anode due to forming of cracks in the alloy itself, that is, due to cracking of the alloy by expansion, contraction and the like, that occur in accompaniment with charging and discharging.

Figure 1:
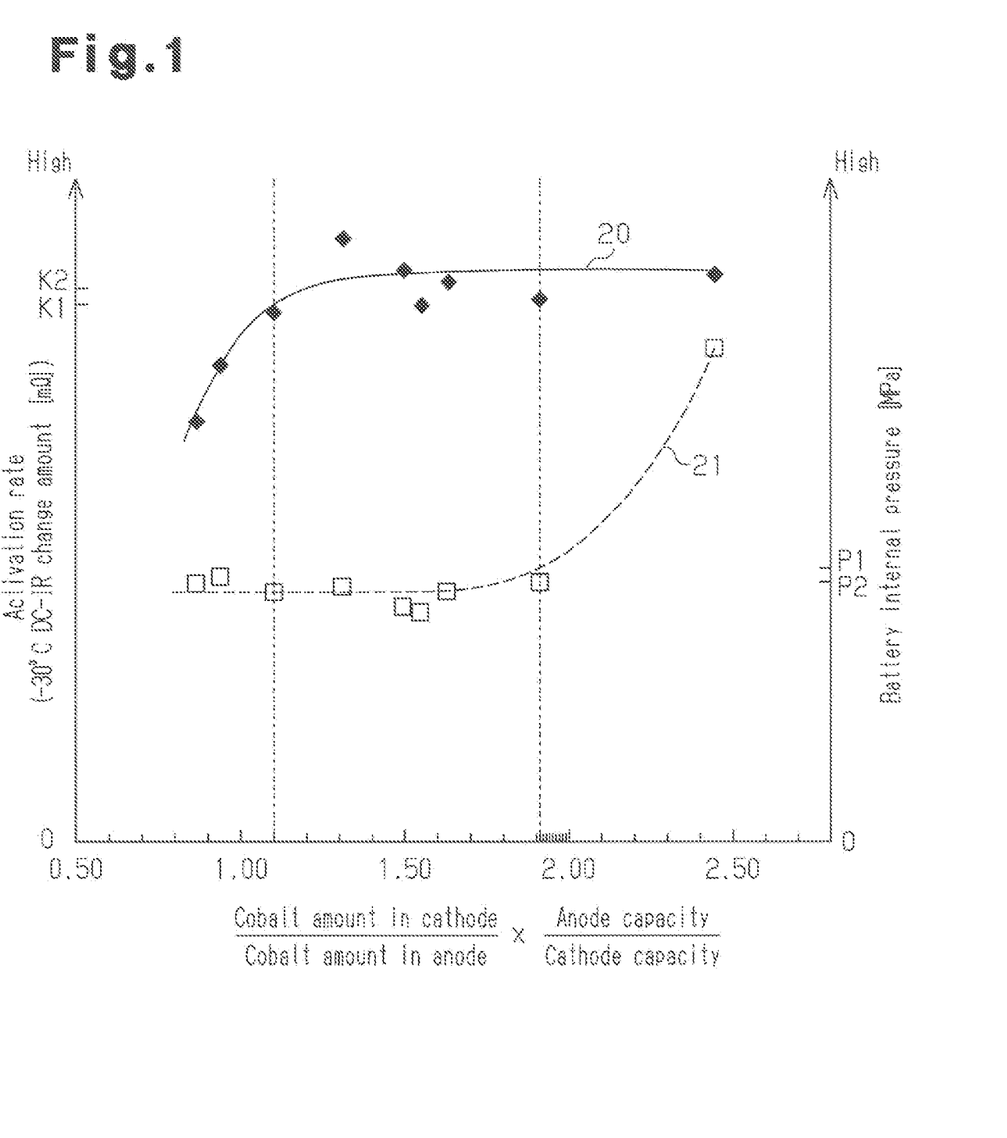
FIG. 1 is a graph illustrating an activation rate (characteristic curve 20, left vertical axis) and a battery internal pressure (characteristic curve 21, right vertical axis) of an alkaline storage battery in accordance with an evaluation value of a cobalt additive amount in the alkaline storage battery according to an embodiment of the present invention.

The activation rate of the nickel-metal hydride storage battery illustrated in FIG. 1 is illustrated as a change amount, that is, a difference between the DC internal resistance (DC-IR) [mΩ] of the nickel-metal hydride storage battery immediately after manufacture and the DC internal resistance [mΩ] of the nickel-metal hydride storage battery after use of the nickel-metal hydride storage battery under certain conditions. In the present embodiment, the DC-IR [mΩ] at −30° C. was measured respectively for the nickel-metal hydride storage battery immediately after manufacture and the nickel-metal hydride storage battery after use under the certain conditions and the difference was determined as the change amount. −30° C. was set on the basis of the usage temperature of an electric vehicle or hybrid electric vehicle. Also, for the sake of convenience, the DC internal resistance of the nickel-metal hydride storage battery at −30° C. is indicated as "−30° C. DC-IR."

To describe in detail, the −30° C. DC-IR is calculated from a relationship of an applied current and a measured voltage in a charging/discharging process in which, after charging the nickel-metal hydride storage battery by an amount corresponding to a certain capacity (SOC 50%), short-time discharging and charging of the storage battery are repeated under an environmental temperature of −30° C. Generally, a storage battery is judged to be better when its internal resistance (IR) is lower.

Specifically, the DC internal resistance (DC-IR) of the nickel-metal hydride storage battery at −30° C. is measured as follows. That is, the storage battery is charged under an ordinary temperature until its state of charge (SOC) is 50%. The storage battery is then cooled to −30° C., thereafter discharged at 10 A for 10 seconds, and from the resulting voltage drop (ΔV), the DC internal resistance (DC-IR) of the nickel-metal hydride storage battery is calculated as ΔV/10 A.

It is known that, in general, as the amount of cobalt contained in the anode increases, the hydrogen-absorbing alloy becomes less likely to crack, that is, lessens in the increase of surface area, thereby decreasing in activation rate and becoming more difficult to activate.

Meanwhile, the battery internal pressure of the nickel-metal hydride storage battery illustrated in FIG. 1 is the battery internal pressure [MPa] of the nickel-metal hydride storage battery under ordinary temperature and is measured as the battery internal pressure of the nickel-metal hydride storage battery after use under the certain conditions with the battery internal pressure of the nickel-metal hydride storage battery immediately after manufacture being set to zero.

The certain conditions of use of the nickel-metal hydride storage battery that are adopted for measurement of the −30° C. DC-IR and the measurement of the battery internal pressure are conditions determined as storage battery usage conditions during so-called typical driving cycle of a vehicle. These conditions may be reproduced by driving a vehicle equipped with the nickel-metal hydride storage battery or by adjusting the charging and discharging conditions and the like of the nickel-metal hydride storage battery in conformity to those during typical driving cycle. The certain conditions in the present embodiment are specifically, the conditions of performing 200 cycles of charging and discharging at 10 A so that the SOC changes in a range of 10% to 70%. That is, the DC-IR and the battery internal pressure of a nickel-metal hydride storage battery that is charged and discharged under such conditions are measured.

[Selection of Cobalt Content Ratio and Capacity Ratio]

As mentioned above, generally with a nickel-metal hydride storage battery, the rate of hydrogen absorption by the hydrogen-absorbing alloy is usually increased by making the anode capacity W no less than 1.5 times the cathode capacity V. However, the excess capacity (W−V) of the anode capacity W with respect to the cathode capacity V is a wasted capacity that is not used by the storage battery. Also, an anode with a large anode capacity W is increased in the usage amount of the alloy, is increased in volume, and also leads to increase of cost. Due to these reasons, it is preferable for the anode capacity W to be small.

On the other hand, it is not easy to increase or decrease the alloys in the electrodes used in a nickel-metal hydride storage battery while optimizing the battery characteristics of the nickel-metal hydride storage battery. That is, the amount of cobalt, which is a metal contained in the anode, cathode, etc., in the present embodiment, is not easily optimized.

For example, when the cobalt content in the anode increases, whereas the life increases because the activation rate decreases and the increase of the battery internal pressure of the nickel-metal hydride storage battery is also lessened because the amount of hydrogen generated is also suppressed, the output is suppressed because the hydrogen-absorbing alloy is made more difficult to activate. Oppositely, when the cobalt content in the anode decreases, whereas the output is generated more readily because the activation rate is increased, hydrogen is generated more readily.

Also, for example, with the anode, when the amount of the hydrogen-absorbing alloy is decreased for the reason of decreasing the usage amount of cobalt, etc., the amount of current per unit alloy increases and the progress of degradation of the hydrogen-absorbing alloy is accelerated. Oppositely, when the amount of the hydrogen-absorbing alloy is increased despite the usage amount of cobalt increasing, whereas the degradation of the hydrogen-absorbing alloy is slowed, the volume and cost increase.

The inventors of the present invention thus combined an evaluation value calculated by a newly determined evaluation formula with the activation rate and the battery internal pressure, which have been used conventionally for evaluation of nickel-metal hydride storage batteries to perform performance evaluation of the nickel-metal hydride storage battery of the present embodiment. It was found that the amount of metal cobalt to be contained in the cathode of the nickel-metal hydride storage battery and the amount of cobalt to be contained in the anode of the nickel-metal hydride storage battery can be optimized based on relationships of the activation rate and battery internal pressure with respect to the evaluation value.

Generally, in regard to the activation rate, the performance of a nickel-metal hydride storage battery is evaluated to be higher when the value of the activation rate is higher, and in regard to the battery internal pressure, the performance is evaluated to be higher when the value of the battery internal pressure of the nickel-metal hydride storage battery after use under the certain conditions is lower. For example, when the activation rate is low, the portion of the anode that is insufficiently activated is not used effectively and current concentrates at the activated portion of the anode, thereby lowering the charging/discharging cycle life and shortening the life of the nickel-metal hydride storage battery. The performance of the nickel-metal hydride storage battery is thus evaluated as being higher when the activation rate is higher. Also, for example, when the amount of gas generated is high and the battery internal pressure is high, the gas generated due to charging is emitted to the exterior from the nickel-metal hydride storage battery in accordance with the internal pressure rise and the discharge reserve amount of the nickel-metal hydride storage battery thus decreases. The nickel-metal hydride storage battery after use under the certain conditions is thus judged to be higher in performance when the amount of gas generated in accompaniment with charging is lower, that is, when the battery internal pressure is lower.

The inventors thus carried out diligent research on the correlation of the activation rate and battery internal pressure that are measured from the nickel-metal hydride storage battery and the amount of cobalt. The inventors then determined an evaluation formula for evaluating the amount of cobalt contained in the electrodes of the storage battery as: (amount of cobalt contained in the cathode/amount of cobalt contained in the anode)×(capacity of the anode/capacity of the cathode). For convenience of description, the "amount of cobalt contained in the cathode/amount of cobalt contained in the anode" may be referred to as the content ratio of cobalt, and the "capacity of the anode/capacity of the cathode" may be referred to as the capacity ratio.

In the present embodiment, the evaluation value is calculated as follows.

> (Amount of cobalt contained in the cathode/amount of cobalt contained in the anode)×(capacity of the anode/capacity of the cathode)=(Mass percentage $X$ of the cathode taken up by metal cobalt in the cathode/mass percentage $Y$ of the hydrogen-absorbing alloy taken up by cobalt in the hydrogen-absorbing alloy)×(capacity $W$ of the anode/capacity of the cathode $V$)=(2.8% by mass/2.7% by mass)×(13000 mAh/10000 mAh)≈1.35

When the evaluation value of the cobalt amount is thus specified, then for example, if when the evaluation value is 1.35, the capacity ratio W/V is set to 1.3, the cobalt content ratio X/Y can be calculated to be approximately 1.04 (=2.8% by mass/2.7% by mass). Also, oppositely, if the cobalt content ratio X/Y is set to approximately 1.04 (=2.8% by mass/2.7% by mass) when the evaluation value is 1.35, the capacity ratio W/V can be calculated to be approximately 1.3.

A characteristic curve 20 and a characteristic curve 21 in FIG. 1 were prepared as follows. That is, nickel-metal hydride storage batteries with cobalt amount evaluation values of 0.85, 0.92, 1.10, 1.30, 1.50, 1.55, 1.62, 1.91, and 2.43, respectively, were produced in the same manner as in the present embodiment. The capacity ratio W/V of the nickel-metal hydride storage batteries is 1.3, and with respect to the evaluation values, the cobalt content ratios X/Y of the nickel-metal hydride storage batteries are 0.65, 0.71, 0.85, 1.00, 1.15, 1.19, 1.25, 1.47, and 1.87, respectively.

The characteristic curve 20 represents a correlation of the activation rate and the corresponding cobalt amount evaluation value and the characteristic curve 21 represents a correlation of the battery internal pressure and the corresponding cobalt amount evaluation value. From the nickel-metal hydride storage battery characteristics represented by the characteristic curves 20 and 21, it was found that the cobalt amount evaluation value is correlated with the value of the activation rate and the value of the battery internal pressure. That is, based on the characteristic curve 20, a range (for example, a lower limit value) of the cobalt amount evaluation value corresponding to a preferable range of the activation rate is determined, and based on the characteristic curve 21, a range (for example, an upper limit value) of the cobalt amount evaluation value corresponding to a preferable range of the battery internal pressure is determined.

As mentioned above, in general, the performance of a nickel-metal hydride storage battery is evaluated to be higher when the value of the activation rate is greater. From the characteristic curve 20, the activation rate is preferably no less than the value K1 and more preferably no less than the value K2. Therefore, from the characteristic curve 20 and the activation rate range, the preferable range of the cobalt amount evaluation value is a range of no less than 1.10 corresponding to the activation rate of no less than the value K1 and a more preferable range is a range of no less than 1.20 corresponding to the activation rate of no less than the value K2. With the nickel-metal hydride storage battery of the present embodiment, the rate of change of the activation rate (the slope of the characteristic curve 20) is approximately 2 mΩ when the cobalt amount evaluation value is 1.20 and the rate of change of the activation rate is less than 2 mΩ when the cobalt amount evaluation value exceeds 1.20. It can thus be said that the activation rate is in a more preferable range when the rate of change of the activation rate is no more than 2 mΩ.

Also, as mentioned above, in general, the performance of a nickel-metal hydride storage battery is evaluated to be higher when the value of the battery internal pressure of the nickel-metal hydride storage battery after use under the certain conditions is lower. From the characteristic curve 21, the battery internal pressure is preferably no more than the value P1 and more preferably no less than the value P2. Therefore, from the characteristic curve 21 and the preferable battery internal pressure range, the preferable range of the cobalt amount evaluation value is a range of no more than 1.91 corresponding to the battery internal pressure of no more than the value P1 and a more preferable range is a range of no more than 1.80 corresponding to the battery internal pressure of no more than the value P2. With the nickel-metal hydride storage battery of the present embodiment, the rate of change of the battery internal pressure (the slope of the characteristic curve 21) is approximately 0.5 MPa when the cobalt amount evaluation value is 1.91 and the rate of change of the battery internal pressure is less than 0.5 MPa when the cobalt amount evaluation value exceeds 1.91. It can thus be said that the battery internal pressure is in a more preferable range when the rate of change of the battery internal pressure rate is no more than 0.5 MPa.

From the above, it can be understood that the characteristics of a nickel-metal hydride storage battery are optimal when both the activation rate and the battery internal pressure of the nickel-metal hydride storage battery are in preferable ranges. That is, the cobalt amount evaluation value corresponding to the nickel-metal hydride storage battery having the optimal characteristics is determined to be in the range of no less than 1.10 and no more than 1.91 and more preferably to be in the range of no less than 1.20 and no more than 1.80. A nickel-metal hydride storage battery satisfying 1.1≤(X/Y)× (W/V)≤1.91 has a preferable activation rate and a preferable battery internal pressure, and it can thus be inferred whether or not a nickel-metal hydride storage battery has optimal characteristics without having to measure the activation rate and the battery internal pressure of the alkaline storage battery.

With the nickel-metal hydride storage battery of the present embodiment (with which the cobalt content ratio is 2.8% by mass/2.7% by mass and the capacity ratio is 13000 mAh/10000 mAh), the cobalt amount evaluation value is 1.35 and is thus within the range of values indicating that the characteristics of the nickel-metal hydride storage battery are optimal characteristics.

The cobalt content ratio can thus be selected based on the activation rate and the battery internal pressure that optimize the characteristics of the nickel-metal hydride storage battery as indicated by the characteristic curves 20 and 21 and on the preferable capacity ratio. Or, the capacity ratio can be selected based on the activation rate and the battery internal pressure that optimize the characteristics of the nickel-metal hydride storage battery and on the preferable cobalt content ratio. The mass percentage X of metal cobalt in the cathode and the mass percentage Y of cobalt contained in the hydrogen-absorbing alloy of the anode can thereby be determined to be optimal.

In the present embodiment, the mass percentage X of cobalt contained in the cathode is set to no less than 2.0% by mass and no more than 4.0% by mass and the mass percentage Y of cobalt contained in the anode is set to no less than 2.5% by mass and no more than 4.0% by mass. The values from 2.0% by mass to 4.0% by mass for the mass percentage X of cobalt contained in the cathode and the values from 2.5% by mass to 4.0% by mass for the mass percentage Y of cobalt contained in the anode are ranges determined by the inventors based on experiments and experience.

That is, the mass percentage X of metal cobalt in the cathode of 2.8% by mass in the present embodiment is included within the above-mentioned range of 2.0% by mass to 4.0% by mass and the mass percentage Y of cobalt contained in the hydrogen-absorbing alloy of the anode of 2.7% by mass is included within the above-mentioned range of 2.5% by mass to 4.0% by mass.

By using the cobalt amount evaluation formula of the present embodiment, the mass percentage X of metal cobalt in the cathode and the mass percentage Y of cobalt contained in the hydrogen-absorbing alloy of the anode can be set to any of various values. For example, if when the cobalt content ratio (X/Y) is 0.8, the mass percentage X of cobalt contained in the cathode is set to 2.0% by mass, the mass percentage Y of cobalt contained in the anode is determined to be 2.5% by mass. On the other hand, if the mass percentage Y of cobalt contained in the anode is set to 4.0% by mass, the mass percentage X of cobalt contained in cathode is determined to be 3.2% by mass.

For example, if when the cobalt content ratio (X/Y) is 1.6, the mass percentage X of cobalt contained in the cathode is set to 4.0% by mass, the mass percentage Y of cobalt contained in the anode is determined to be 2.5% by mass. Oppositely, if the mass percentage Y of cobalt contained in the anode is set to 2.5% by mass, the mass percentage X of cobalt contained in cathode is determined to be 4.0% by mass.

For example, if when the cobalt content ratio (X/Y) is 0.5, the mass percentage X of cobalt contained in the cathode is set to 2.0% by mass, the mass percentage Y of cobalt contained in the anode is determined to be 4.0% by mass. Oppositely, if the mass percentage Y of cobalt contained in the anode is set to 4.0% by mass, the mass percentage X of cobalt contained in cathode is determined to be 2.0% by mass.

For example, if when the cobalt content ratio (X/Y) is 1.0, the mass percentage X of cobalt contained in the cathode is set to 2.5% by mass, the mass percentage Y of cobalt contained in the anode is determined to be 2.5% by mass. Oppositely, if the mass percentage Y of cobalt contained in the anode is set to 4.0% by mass, the mass percentage X of cobalt contained in cathode is determined to be 4.0% by mass.

Operations and effects of the present embodiment will be described.

The characteristic curve 20 illustrated in FIG. 1 illustrates that when the value of the cobalt amount evaluation formula is no less than 1.10, the activation rate of the nickel-metal hydride storage battery is no less than the value K1 and the characteristics of the nickel-metal hydride storage battery are satisfactory. Also, the characteristic curve 21 illustrates that when the value of the cobalt amount evaluation formula is no less than 1.91, the battery internal pressure is no more than the value P1 and the characteristics of the nickel-metal hydride storage battery are satisfactory. From the above, in order to optimize the characteristics of the nickel-metal hydride storage battery, the parameters included in the cobalt amount evaluation formula are set so that the value of the cobalt amount evaluation formula falls within the range from 1.10 to 1.91 (preprocessing step). That is, the mass percentage X of cobalt contained in the cathode, the mass percentage Y of cobalt contained in the anode, the capacity V of the cathode, and the capacity W of the anode are respectively set so that the value of the cobalt amount evaluation formula falls within the range from 1.10 to 1.91.

For example, if when 1.10 is selected as the evaluation value, the capacity ratio (W/V) is 1.20, the cobalt content ratio (X/Y) is determined to be approximately 0.92. From this, if the mass percentage X of cobalt contained in the cathode is 2.3% by mass to 3.7% by mass, the mass percentage Y of cobalt contained in the anode is determined to be approximately 2.5% by mass to 4.0% by mass.

Also, for example, if when 1.10 is selected as the evaluation value, the capacity ratio (W/V) is 1.48, the cobalt content ratio (X/Y) is determined to be approximately 0.74. From this, if the mass percentage X of cobalt contained in the cathode is 2.0% by mass to 3.0% by mass, the mass percentage Y of cobalt contained in the anode is determined to be approximately 2.7% by mass to 4.0% by mass.

Further for example, if when 1.91 is selected as the evaluation value, the capacity ratio (W/V) is 1.20, the cobalt content ratio (X/Y) is determined to be approximately 1.6. From this, if the mass percentage X of cobalt contained in the cathode is 4.0% by mass, the mass percentage Y of cobalt contained in the anode is determined to be approximately 2.5% by mass.

Also, for example, if when 1.91 is selected as the evaluation value, the capacity ratio (W/V) is 1.48, the cobalt content ratio (X/Y) is determined to be approximately 1.29. From this, if the mass percentage X of cobalt contained in the cathode is 3.2% by mass to 4.0% by mass, the mass percentage Y of cobalt contained in the anode is determined to be approximately 2.5% by mass to 3.1% by mass.

The mass percentage X of cobalt contained in the cathode, the mass percentage Y of cobalt contained in the anode, the capacity V of the cathode, and the capacity W of the anode, which are the parameters included in the cobalt amount evaluation formula, can thus be set respectively.

As described above, with the alkaline storage battery of the present embodiment, the effects listed below are obtained.

(1) Although it is preferable for the mass percentage X of cobalt of the cathode and the mass percentage Y of cobalt of the anode to be such that the effects thereof are exhibited even if these are of the minimum amounts, when the mass percentage X of cobalt of the cathode is decreased, the life of the storage battery shortened. Also, when the mass percentage Y of cobalt of the anode is decreased, hydrogen gas is readily generated and leads to internal pressure rise, etc., and it is thus difficult to optimize the mass percentage X of cobalt of the cathode and the mass percentage Y of cobalt of the anode.

Therefore, in the present embodiment, the mass percentage X of cobalt contained in the cathode and the mass percentage Y of cobalt contained in the anode are set optimally based on the cobalt content ratio, which is the ratio of the mass percentage X of metal cobalt and other cobalt contained in the cathode and the mass percentage Y of cobalt contained in the anode, and the capacity ratio, which is the ratio of the capacity V of the cathode, and the capacity W of the anode. That is, the contents of cobalt, which is one of the metals making up the cathode and anode, in the cathode and anode are adjusted to promote the optimization of the characteristics of the alkaline storage battery (nickel-metal hydride storage battery).

Also, cobalt is expensive and therefore by optimizing the usage amount of cobalt, the cost of the alkaline storage battery can also be suppressed.

(2) Adjustment of the usage amount of cobalt, including metal cobalt, cobalt in the hydrogen-absorbing alloy, etc., in the alkaline storage battery is facilitated because the mass percentage X of cobalt added to the cobalt by way of metal cobalt mixed in the cathode and the mass percentage Y of cobalt contained in the hydrogen-absorbing alloy of the anode are specified to be within certain ranges.

(3) With respect to the capacity V of the cathode, the capacity W of the anode was set to no less than 1.20 and no more than 1.48. The capacity of the anode that was conventionally no less than 1.5 times the capacity of the cathode can thus be suppressed to be low and wasteful capacity of the anode of the nickel-metal hydride storage battery can be lessened.

(4) The value of $(X/Y) \times (W/V)$ is selected based on the rate of change of the activation rate [m$\Omega$] of the nickel-metal hydride storage battery and the rate of change of the battery internal pressure [MPa] of the nickel-metal hydride storage battery. The mass percentage X of cobalt of the cathode, the decrease of which causes decrease of the activation rate, and the mass percentage Y of cobalt of the anode, the decrease of which causes hydrogen gas to be generated readily and leads to internal pressure rise, can thus be optimized based on appropriate indices. Therefore, a nickel-metal hydride storage battery that is configured based on the selected values will have a preferable activation rate and a preferable battery internal pressure.

(5) A nickel-metal hydride storage battery increases in internal resistance as the ambient temperature decreases and therefore, its battery performance as an alkaline storage battery is higher when the internal resistance at −30 degrees Celsius is lower. Therefore, by using the activation rate at −30° C., which calculated based on the −30° C. DC-IR that is the internal resistance at −30 degrees Celsius measured immediately after manufacture of the nickel-metal hydride storage battery and the −30° C. DC-IR measured under the certain conditions, that is, measured after so-called field driving, as an evaluation index, it becomes possible to maintain the nickel-metal hydride storage battery performance at a high level even when the ambient temperature is low.

(6) By coating with cobalt oxyhydroxide, the capacity characteristics, especially the capacity characteristics at high temperature of the nickel-metal hydride storage battery can be made satisfactory.

The embodiment described above may be changed as follows.

Although with the embodiment, a case where the battery case of the nickel-metal hydride storage battery is made of resin was described as an example, the battery case of the nickel-metal hydride storage battery is not restricted thereto and may be formed of metal or other material besides resin as long as the power generation element can be housed favorably. The degree of freedom of design of the nickel-metal hydride storage battery can thereby be enlarged.

Although with the embodiment, a case where the average particle diameter of the nickel hydroxide powder is 10 μm was described as an example, the average particle diameter of the nickel hydroxide powder is not restricted thereto and may be no less than 5 μm and no more than 20 μm. The degree of freedom related to the preparation of the nickel hydroxide particles is thereby improved.

Although with the embodiment, a cathode that does not contain an additive besides the cobalt additive was described as an example, the cathode is not restricted thereto and may have added therein an additive (for example, zinc oxide, etc.) besides the cobalt additive as necessary. In this case, the mass of the additive besides the cobalt additive is included in the mass of the cathode used for determining the mass percentage X. The degree of freedom of design of the nickel-metal hydride storage battery can thereby be improved.

With the embodiment, a case where the capacity ratio, that is, the capacity W of the anode/capacity V of the cathode is set to 1.3 was described as an example. However, the capacity ratio is not restricted thereto and may be set to any value in the range of 1.20 to 1.48. Even in this case, the capacity of the anode can be lessened in comparison to the conventional capacity ratio of 1.5. The degree of freedom of design of the nickel-metal hydride storage battery can thereby be improved.

Further, if the value of the cobalt amount evaluation formula can be set in the range of 1.10 to 1.91, the value of the capacity ratio may be set to a value less than 1.20 or to a value greater than 1.48. The degree of freedom of design of the nickel-metal hydride storage battery can be improved thereby as well.

With the embodiment, a case where the mass percentage X of metal cobalt added to the cathode is set to 2.8% by mass was described as an example. However, the amount of metal cobalt is not restricted thereto and may be any value selected from 2.0% by mass to 4.0% by mass. The degree of freedom of design of the nickel-metal hydride storage battery can thereby be improved.

Further, if the value of the cobalt amount evaluation formula can be set in the range of 1.10 to 1.91, the amount of metal cobalt may be set to a value less than 2.0% by mass or a value greater than 4.0% by mass. The degree of freedom of design of the nickel-metal hydride storage battery can be improved thereby as well.

With the embodiment, a case where the percentage Y of cobalt contained in the hydrogen-absorbing alloy of the anode corresponds to 2.7% by mass (0.2 moles) of the total mass of metals contained in the hydrogen-absorbing alloy was described as an example. However, the amount of cobalt contained in the hydrogen-absorbing alloy is not restricted thereto and may be of any value selected from 0.18 moles to 0.3 moles, that is, may be of any value selected from 2.5% by mass to 4.0% by mass of the metals contained in the hydrogen-absorbing alloy. The degree of freedom of design of the nickel-metal hydride storage battery can thereby be improved.

Further, if the value of the cobalt amount evaluation formula can be set in the range of 1.10 to 1.91, the amount of cobalt contained in the hydrogen-absorbing alloy may be set to a value less than 0.2 moles (2.7% by mass) or a value greater than 0.3 moles (4.0% by mass). The degree of freedom of design of the nickel-metal hydride storage battery can be improved thereby as well.

With the embodiment, a case where a metal cobalt powder is added as the cobalt additive to the cathode was described as an example. However, the cobalt additive is not restricted to a metal cobalt powder and may, for example, be a cobalt compound, such as cobalt hydroxide, cobalt trioxide, cobalt tetroxide, or cobalt monoxide or a mixture of metal cobalt and a cobalt compound. The cobalt additive may be a powder or may be particles. The degree of freedom of design of the cathode of the nickel-metal hydride storage battery can thereby be improved.

With the embodiment, a case where the cobalt amount evaluation formula is expressed as: (mass percentage X of cobalt contained in the cathode)/(mass percentage Y of cobalt contained in the anode)×(capacity W of the anode)/(capacity V of the cathode) was described as an example. However, the cobalt amount evaluation formula is not restricted thereto and may be changed to: (mass percentage Y of cobalt contained in the anode)/(mass percentage X of cobalt contained in the cathode)×(capacity V of the cathode)/(capacity W of the anode). In this case, a reciprocal of the value of the cobalt amount evaluation formula described for the embodiment may be used as the value of the modified evaluation formula. The degree of freedom of expression of the evaluation formula is thereby increased to improve convenience in design, etc.

With the embodiment, a case where the DC-IR at −30° C. is measured was described as an example. However, the temperature at which the DC-IR is not restricted thereto and may be set to −20° C. or −40° C., etc. Evaluation of characteristics of the nickel-metal hydride storage battery can thereby be performed appropriately in accordance with the usage environment.

Although with the embodiment, a case where the battery is a rechargeable battery was described as an example, the battery is not restricted thereto and may be a primary battery.

The invention claimed is:

1. An alkaline storage battery comprising:
a cathode including nickel hydroxide particles coated with a cobalt compound coating layer, and a cobalt additive; and
an anode including a hydrogen-absorbing alloy that contains nickel and cobalt,
wherein
the cathode has a capacity V,
the anode has a capacity W,
the cobalt additive is metal cobalt or a cobalt compound,
the cobalt additive is contained at X % by mass in the cathode,
the cobalt is contained at Y % by mass in the hydrogen-absorbing alloy, and X, Y, V, and W satisfy $1.1 \leq (X/Y) \times (W/V) \leq 1.91$, wherein X/Y is between 0.65 and 1.87.

2. The alkaline storage battery according to claim 1,
wherein an evaluation value determined by $(X/Y) \times (W/V)$ is in accordance with a range in which a rate of change of an activation rate of the alkaline storage battery with respect to the evaluation value is no more 2 mΩ and a range in which a rate of change of a battery internal pressure of the alkaline storage battery with respect to the evaluation value is no more than 0.5 MPa.

3. The alkaline storage battery according to claim 2,
wherein the activation rate of the alkaline storage battery is calculated from a difference between a DC internal resistance at −30 degrees Celsius of the alkaline storage battery immediately after manufacture and the DC internal resistance at −30 degrees Celsius of the alkaline storage battery after use of the alkaline storage battery under certain conditions.

4. The alkaline storage battery according to claim 1,
wherein the cobalt compound coating layer is made of cobalt oxyhydroxide.

5. A method of manufacturing an alkaline storage battery including a cathode, which includes nickel hydroxide particles coated with a cobalt compound coating layer, and a cobalt additive, and an anode, which includes a hydrogen-absorbing alloy that contains nickel and cobalt, the method comprising:
adding metal cobalt or a cobalt compound as the cobalt additive to the nickel hydroxide particles coated with the cobalt compound coating layer to prepare the cathode having a capacity V and containing X % by mass of the cobalt additive;
preparing the anode having a capacity W from the hydrogen-absorbing alloy, with the hydrogen-absorbing alloy containing Y % by mass of the cobalt; and a preprocessing step of respectively setting X, Y, V, and W to satisfy $1.1 \leq (X/Y) \times (W/V) \leq 1.91$ before the preparing the cathode and the preparing the anode, wherein X/Y is between 0.65 and 1.87.

* * * * *